(12) United States Patent
Fuks et al.

(10) Patent No.: US 8,684,379 B2
(45) Date of Patent: Apr. 1, 2014

(54) CAST STEERING KNUCKLE FOR A VEHICLE AND VEHICLE COMPRISING A CAST STEERING KNUCKLE

(75) Inventors: Leon Fuks, Angered (SE); Lena Larsson, Västra Frölunda (SE); Ingemar Dagh, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 274 days.

(21) Appl. No.: 13/140,462

(22) PCT Filed: Dec. 17, 2008

(86) PCT No.: PCT/SE2008/000712
§ 371 (c)(1),
(2), (4) Date: Jul. 7, 2011

(87) PCT Pub. No.: WO2010/071485
PCT Pub. Date: Jun. 24, 2010

(65) Prior Publication Data
US 2013/0193659 A1     Aug. 1, 2013

(51) Int. Cl.
*B62D 7/18* (2006.01)
*B22D 19/00* (2006.01)

(52) U.S. Cl.
USPC .................................................. 280/93.512

(58) Field of Classification Search
USPC ............... 280/93.512, 124.125, 773; 301/6.5
See application file for complete search history.

(56) References Cited

U.S. PATENT DOCUMENTS

| | | | | |
|---|---|---|---|---|
| 1,891,459 | A | * | 12/1932 | Thomas .......................... 184/7.3 |
| 2,027,366 | A | * | 1/1936 | Bijur ............................... 184/7.3 |
| 6,099,003 | A | * | 8/2000 | Olszewski et al. ........ 280/93.512 |
| 6,364,073 | B1 | | 4/2002 | Fierro et al. |
| 7,051,768 | B2 | * | 5/2006 | Takahashi ..................... 138/143 |
| 7,104,559 | B2 | * | 9/2006 | Shimosato et al. ....... 280/93.512 |
| 7,231,703 | B2 | * | 6/2007 | Shimosato et al. ............. 29/557 |
| 2007/0277645 | A1 | * | 12/2007 | Weisskopf et al. .......... 74/579 E |
| 2008/0036284 | A1 | | 2/2008 | Murata |

FOREIGN PATENT DOCUMENTS

| | | |
|---|---|---|
| DE | 4141793 A1 | 6/1993 |
| DE | 19653542 A1 | 6/1998 |
| DE | 10304971 A1 | 6/2004 |
| EP | 1216848 A2 | 6/2002 |
| WO | 03016730 A1 | 2/2003 |
| WO | 2007009219 A1 | 1/2007 |

OTHER PUBLICATIONS

International Search Report for corresponding International Application PCT/SE2008/000712.
International Preliminary Report on Patentability for corresponding International Application PCT/SE2008/000712.
Supp. European Search Repprt (Jul. 11, 2012) for corresponding European Application No. EP 08 87 8962.

* cited by examiner

*Primary Examiner* — Drew Brown
(74) *Attorney, Agent, or Firm* — WRB-IP LLP

(57) ABSTRACT

A cast steering knuckle for a vehicle such as a truck includes a knuckle body. One or more pipes, each including a pipe body, are molded into the knuckle body providing a duct for a fluid and/or one or more electrical harnesses.

19 Claims, 6 Drawing Sheets

CAST STEERING KNUCKLE FOR A VEHICLE AND VEHICLE COMPRISING A CAST STEERING KNUCKLE

BACKGROUND AND SUMMARY

The invention relates to a cast steering knuckle for a vehicle and a vehicle comprising a cast steering knuckle.

It is known to use cast steering knuckles for suspension of wheels for commercial vehicles, particularly trucks. For making more efficient commercial vehicles available, one is desirous to equip such vehicles with hydraulic driven steered wheels. Necessary fluid connections are fed through the steering knuckles. This is achieved by drilling channels in the cast body of the steering knuckle for supplying hydraulic oil to the hydraulic wheel motors. However, available lengths and widths of the drilled channels are restricted as well as the density of channels.

It is desirable to provide an improved cast steering knuckle comprising fluid channels enabling an optimized flow of fluid, wherein the optimized flow has reduced losses. It is also desirable to provide a vehicle comprising an improved cast steering knuckle.

A cast steering knuckle is proposed for a vehicle, particularly a commercial vehicle, more particularly a truck, comprising a knuckle body. One or more pipes, each comprising a pipe body, are moulded into the knuckle body providing one or more channels in the knuckle body as ducts for a fluid and/or one or more electrical harnesses.

Preferably, the channels can be provided for transporting a fluid. Fluids in terms of the invention can be liquid, e.g. hydraulic fluid, or gaseous, e.g. compressed air. The flow resistance in the pipe(s) has a large influence on the flow of fluids. Losses caused by the flow resistance can influence the flow velocity, the pressure and/or the temperature of the fluid in a way, that the function of a device placed at or near the steering knuckle, e.g. a hydraulic wheel motor or a central tire inflation system (CTIS), is disturbed. The flow resistance can substantially be influenced by bends of the pipe(s) and the roughness of the inner surface of the pipe(s). One or more channels can also be used as a feedthrough for one or more electric cables.

Favourably, the design of the steering knuckle according to the invention makes it possible to reduce the flow resistance and to improve the flow of the fluid compared to techniques such a drilling channels or forming channels by casting the knuckle with sand cores in desired positions of the channel. The routing and the surface of the fluid channel are defined by the one or more moulded-in pipe. In this way an improved flow resistance even for very complex routing and/or long fluid channels comprising several bends can be achieved.

Favourably, before the moulding-in, the one or more pipes can be performed to and bent in various directions and angles according to a desired design. Particularly in bends, the inner surfaces of the one or more pipes are smooth and nicely bent thus yielding a favourable low flow resistance. With the technique of drilling channels smoothly bent channels or channels with complex routing cannot be achieved.

Favourably, it is easy to manufacture pipes with smooth inner surfaces. By casting the knuckle body employing sand cores according to the known art for the fluid channels, the inner surfaces of the channels are rough compared to the inner surfaces of the inventive pipe because of the structure of the sand grains. Further there is a risk that sand grains may remain in the channel and contaminate the fluid.

Favourably, the routing of the one or more pipes in the cast steering knuckle can be optimized against weight and stability of the cast steering knuckle and the steering properties.

According to a favourable embodiment of the invention, the one or more pipes can be equipped with at least one fitting before casting the knuckle body. Such fittings can be mounted easily before casting the knuckle body, particularly if the fittings have to be placed in areas of the knuckle body which are difficult of access. The fittings provide easy connections to other pipes or equipment outside the steering knuckle. Favourably, the one or more pipes can be preassembled thus facilitating the manufacture of the steering knuckle.

According to a further favourable embodiment of the invention, one or more pipes can be equipped with at least one front mounting which integrates one or more free ends of the one or more pipes. The free ends can be protected during the casting process. The front mounting can also create or maintain a well defined shape of the free ends thus facilitating to connect the free ends to a fitting or a pipe connector. Further, the front mounting can be adapted for holding the one or more pipes in the knuckle body in position during the moulding process. Besides this the front mounting can be adapted for sealing the free ends of the pipes during the casting process particularly to prevent molten material to enter the one or more pipes. Advantageously, the front mounting can provide areas which allow a torsionally stiff connection to an axle, e.g. for reliably handling high torques when a hydraulic motor attached to the steering knuckle.

According to a further favourable embodiment of the invention, at least one of the one or more pipes can be bent at least by 90°. In this way an optimization of the pipe routing can be achieved. Bending the one or more pipes by more than 90° can also be achieved thus allowing using available space in the knuckle body. Such a shape of the channel can hardly be achieved with drilling or sand core casting.

According to a further favourable embodiment of the invention, the bending radius of one or more pipes can be larger than the inner diameter of the respective pipe. This can favourable reduce the pressure drop of a medium flowing in the pipe. For instance, the bending radius can be at least twice as large as the inner diameter.

According to a further favourable embodiment of the invention, at least one of the one or more pipes can be bent at least in two dimensions. Thus very complex pipe routings can be realized, which is virtually impossible with known art techniques such as drilling channels.

According to a further favourable embodiment of the invention, the pipe body of at least one of the one or more pipes can have one or more hydroformed portions along its pipe body. Of course, the complete pipe body can by manufactured by hydroforming. Hydroforming is a cost-effective way of shaping malleable metals into lightweight, structurally stiff and strong pieces. Hydroformed pipes or portions of pipes can be very nicely bent and can have very smooth inner surfaces which are favourable for a low flow resistance of the pipes. Different from using sand cores or drilling the channel, there is no risk that particles, i.e. sand grains, rubbings or wear debris, remain in the channel. Further, by hydroforming portions of the pipe body, the cross section of the pipe body can be increased where enough space is available for the channel in the knuckle body and decreased at positions where space in the knuckle body is restricted. Thus, such hydroformed pipes make it possible to provide flow-optimized cross-sections of the pipes. Particularly, the cross-section can vary along the length of the pipe for providing a flow-optimized pipe. More particularly, the cross-section can have a profile which makes use of locally available space. The cross-section is not necessarily circular but can be of any form, such as elliptic or angled, e.g. triangular, square-shaped or of a more complex shape where appropriate. The cross-section can change from a round, e.g. circular or elliptic to an angled cross-section and vice versa along the length of a pipe, which allows for a very flexible design of the pipes and an improved usage of available space inside the steering knuckle.

Preferably at least one of the one or more pipes can have a hydroformed body. Thus the whole pipe body can easily be formed in only one step.

According to a further favourable embodiment of the invention, at least one of the one or more pipes can have a length of at least five times, preferably at least eight times the diameter, particularly the outer diameter. Thus long fluid channels can be achieved in the cast steering knuckle, since pipes with pipe bodies are stable even if they are long compared with their diameter. "Long" means that the length of the channel is at least five times of the diameter, preferably at least eight times the diameter. With other techniques known in the art like using a sand core, the length of the channel is limited, since a long sand core with a small diameter will break.

The cross sections of the pipes are not necessarily circular but can have an oval shape, a triangular shape, a square shape or any cross section which is desired. It is even possible for optimizing the usage of space in the knuckle body and/or for adapting the flow resistance or the flow properties of the pipes to provide one or more pipes with varying diameters and/or cross sections along their extensions.

According to a further favourable embodiment of the invention, the one or more pipes can be concentrated in a middle portion of the knuckle body. In this way the stability of the cast steering knuckle can be improved. Further the pipes can be protected by the surrounding material of the cast steering knuckle. Another advantage is that heat compensation between the fluid in the pipe and the knuckle body can be improved.

According to a further favourable embodiment of the invention, the one or more pipes can be fixed together before casting the knuckle body. In this way the one or more pipes can be held in position during casting of the knuckle body.

In accordance with a further advantageous embodiment of the invention, cast material of the knuckle body can be arranged between the one or more pipes. Thus the stability of the knuckle body and the pipes can be further improved. Besides this, the cast material can act as a thermal isolation between the pipes. On the other hand, the cast material can further improve the heat compensation between the fluid in the pipes and the knuckle body.

According to a further favourable embodiment of the invention, at least one of the one or more pipe bodies can be provided with a surface coating at the outer surface. In this way the contact between the cast material and the pipe can be optimized. Particularly, the flow ability of the cast material along the pipe during the casting process can be improved, so that in particular blistering in the cast material near the outer surface of the pipe can be prevented. It is also possible to provide a coating at the inner surface of the one or more pipes for e.g. corrosion protection or the like. Favourably, the inner surface can be treated before casting the knuckle body.

Particularly, the surface coating at the outer surface can comprise zinc or tin. Zinc and tin are well-suited as surface coatings in particular for preventing blistering in the cast material.

In accordance with a further favourable embodiment of the invention, at least one of the one or more pipes can be provided as duct for a hydraulic fluid. Thus the cast steering knuckle can be used for hydraulic devices such as hydraulic wheel motors for hydraulic driven steered wheels.

According to a further favourable embodiment of the invention, at least three pipes can be contained in the knuckle body particularly for driving a hydraulic motor mounted on the steering knuckle. In this way the pipes can be adapted for transporting fluid with different specific functions and/or characteristics. In particular two pipes can be adapted for inflow and outflow of fluid for driving the hydraulic wheel motor and one pipe e.g. for draining.

According to a further favourable embodiment of the invention, at least three pipes can be casted in the axle part of the steering knuckle. The axle part of the steering knuckle is the part where the hydraulic fluid has to be transferred to the rotating hydraulic motor.

According to a further favourable embodiment of the invention, at least four pipes can be contained in the knuckle body. In this way the pipes can be adapted for transporting fluid with different specific functions and/or characteristics. In particular two pipes can be adapted for inflow and outflow of fluid for driving a device, e.g. a hydraulic wheel motor, and two pipes can be adapted for inflow and outflow of fluid for controlling the device. It is also possible to use the pipes for different liquid or gaseous fluid(s) in particular for controlling and/or driving the device. As the steering knuckle can be provided for bearing a motor, the pipes can be used for transporting hydraulic oil, coolant particularly for supplying a hydraulic motor, as well as be used as feedthrough for electric harnesses used for connection to sensors and/or actuators or a power supply of e.g. an electric motor instead of a hydraulic motor attached to the steering knuckle.

Preferably, pipe diameters can be between 10 to 20 mm. One or more pipes can have varying diameters from one end to the other end. For transporting fluids, particularly under high pressure, to and from a hydraulic motor attached to the steering knuckle it is advantageous to provide pipes with diameters as large as possible to be able to supply the necessary amount of hydraulic oil and/or coolant to the hydraulic motor. A hydraulic motor needs a very high flow of hydraulic oil during operation. In a steering knuckle, however, size restrictions apply. Particularly hydroformed pipes provide the possibility to vary the diameter of the pipes along their extension and to optimize the cross-section in such a way. Pipes with smaller diameters can be used for low pressure fluids, e.g. for a fluid with constant pressure, for draining and for electric cables, e.g. for sensors, actuators and the like.

The invention is not limited to cast steering knuckles with hydraulic wheel motors. The invention can be applied to installations with central tire inflation systems (CTIS). In this case the pipe(s) is/are adapted for transporting compressed air.

According to a further aspect of the invention, a vehicle, particularly a commercial vehicle, more particularly a truck, is proposed with the inventive cast steering knuckle. Wheels are coupled to the cast steering knuckles provided with a hydraulic motor. So it is possible to realize a vehicle with hydraulic driven steered wheels with all advantages of the invention.

BRIEF DESCRIPTION OF THE DRAWINGS

The present invention together with the above-mentioned and other objects and advantages may best be understood from the following detailed description of the embodiments, but not restricted to the embodiments, wherein are shown schematically.

DETAILED DESCRIPTION

Figure 1:
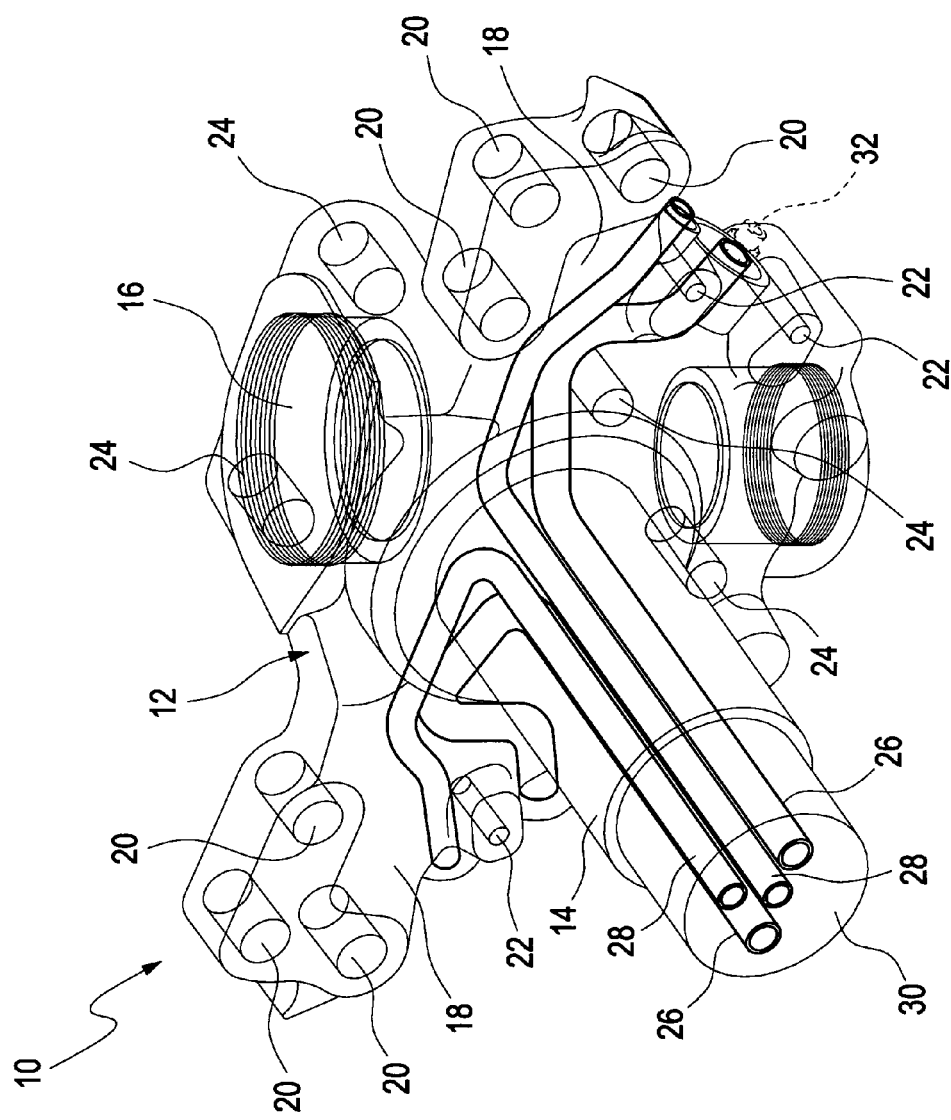
FIG. 1 an isometric drawing of a first embodiment of a cast steering knuckle according to the invention, wherein pipes are moulded in a knuckle body, which is shown partially transparent.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

Figure 2:
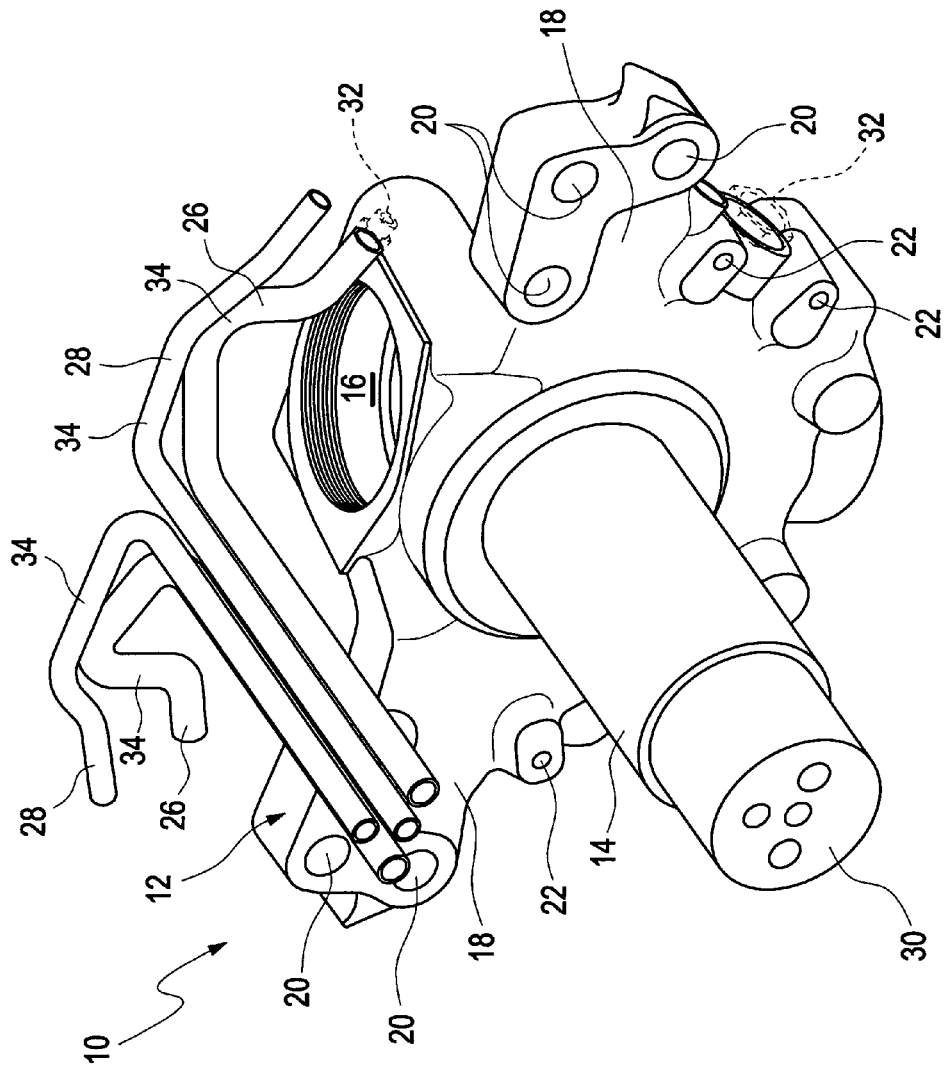
FIG. 2 an explosion diagram of the cast steering knuckle of FIG. 1.
Figure 3:
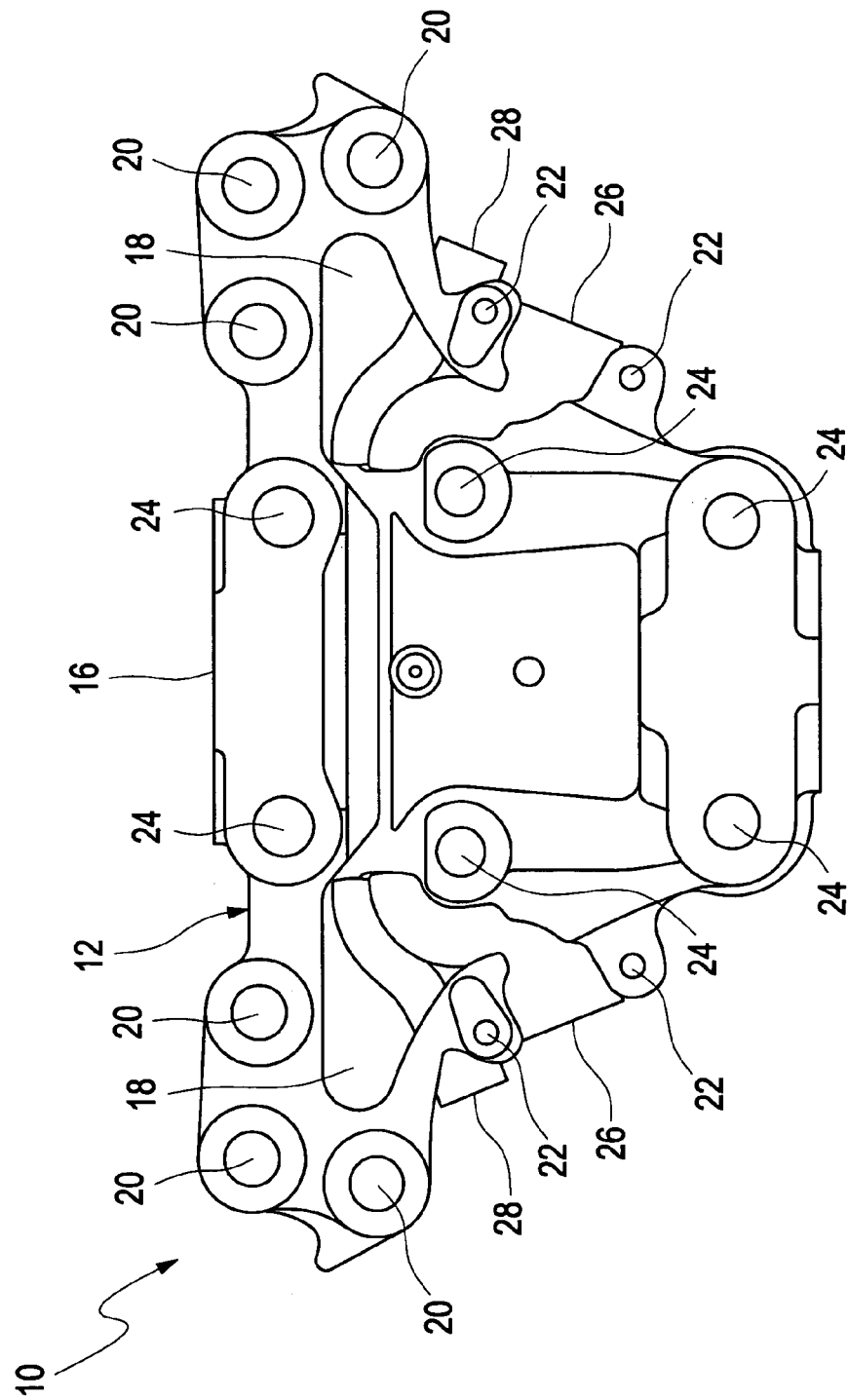
FIG. 3 a rear view of the cast steering knuckle of FIGS. 1 and 2.

FIGS. 1 to 3 depict schematically a first embodiment of a cast steering knuckle 10 for a truck. A wheel (not shown) is coupled to the cast steering knuckle 10 provided with a hydraulic wheel motor.

The cast steering knuckle 10 comprises a knuckle body 12 with a complex shape. The knuckle body 12 has a stub axle 14 which is shown in FIGS. 1 and 2. The knuckle body 12 further has a multiple-step receptacle through hole 16 for kingpin bearings for a kingpin (not shown) of a steering system of the truck. The routing of the receptacle through-hole 16 appears on the rear side of the knuckle body 12 shown in FIG. 3.

Further the knuckle body 12 has on opposite sides of the receptacle through-hole 16 two mounting flanges 18 for steering arms of the steering system and for the wheel motor (not shown). Each mounting flange 18 comprises three mounting through holes 20 for securing the steering arms and two mounting through holes 22 for securing the wheel motor each by use of bolts for example.

Opposite to the stub axle 14 (FIG. 3), six blind holes 24 are located in the outer surface on the rear side of the knuckle body 12.

The receptacle through hole 16, one or more of the mounting through holes 20 and 22 and the blind holes 24 can be made in the casting process by using e.g. sand cores. Alternatively the receptacle through hole 16, the mounting through holes 20 and/or 22 and/or the blind holes 24 can be drilled after the casting process.

Four pipes 26 and 28, each comprising by way of example a hydroformed pipe body, are moulded into the knuckle body 12. Each pipe 26 and 28 can provide a duct for hydraulic oil. The diameter of two pipes 26 is identical and larger than the diameter of the two pipes 28.

The pipes 26 and 28 are concentrated in a middle portion of the knuckle body 12. In the stub axle 14, the four pipes 26 and 28 are parallel as can be seen in FIG. 1. With one end each of the pipes 26 and 28 extends to the end face 30 of the stub axle 14. With the opposite end, one large pipe 26 and one thin pipe 28 each extends to one of the mounting flanges 18 and free ends of the other pipes 26 and 28 extend to side edges of the mounting flanges 18. The larger pipes 26 each end between the two mounting through holes 22 for the wheel motor there. The thinner pipes 28 each end between one of the mounting through holes 22 for the wheel motor and one of the mounting through holes 20 for the steering arm.

In the transition range between the stub axle 14 and the mounting flanges 18, the pipes 26 and 28 exhibit bends of 90° and more. Favourably, the bending radius can be twice the inner diameter of the pipes 26, 28.

The pipes 26 and 28 are multiply bent in three dimensions along their extension for getting an improved routing in the knuckle body 12 along the receptacle through hole 16 for the kingpin bearings, the mounting through holes 20 and 22 in the mounting flanges 18 and the blind holes 24. In sections of the mounting flanges 18 with reduced thickness the routing of the pipes 26 and 28 appear on the rear side of the knuckle body 12 shown in FIG. 3. Each pipe 26 and 28 has a length of at least eight times the diameter. This is quite long compared to prior art fluid channels in a cast steering knuckle 10 and allows an optimized routing. Between the pipes 26 and 28 cast material of the knuckle body 12 is arranged for improving the stability of the knuckle body 12 and improving the heat transfer between the fluid and the cast material.

The four pipes 26 and 28 are equipped with fittings 32 at their free ends before casting the knuckle body 12. One of the fittings 32 is shown exemplary in FIGS. 1 and 2 at the end of the lower right hand pipe 26. By use of the fittings 32 the ends of the pipes 26 and 28 can be connected to hydraulic lines (not shown in FIGS. 1 and 3) easily and quickly. The ends of the pipes 26 and 28 in the mounting flanges 18 can be connected to hydraulic lines leading to or coming from a hydraulic system of the truck. The ends of the pipes 26 and 28 in the end face 30 of the stub axle 14 can be connected with hydraulic lines of the hydraulic wheel motor (not shown).

The pipes 26 and 28 are provided with a surface coating at the outer surface 34 (FIG. 2). The surface coating comprises zinc. During the casting process the surface coating optimizes the connection of the cast material and the outer surface 34 of the pipes 26 and 28 and prevents blistering.

For production of the cast steering knuckle 10, the pipes 26 and 28 can be bent in their desired shape by use of the method of e.g. hydroforming.

The outer surfaces 34 of the pipes 26 and 28 can be coated with zinc. The free ends of the pipes 26 and 28 can be equipped with the fittings 32.

The pipes 26 and 28 can be fixed in a casting mould (not shown) for the knuckle body 12. Not depicted cores for realizing the receptacle through hole 16, the mounting through holes 20 and 22 and the blind holes 24 can be located in the casting mould. Alternatively, one or more of the through holes 16, 20 and/or 22 and/or blind holes 24 can be drilled after the casting process. In this case the relevant cores are dispensable.

The molten cast material can be poured in the casting mould, so that the pipes 26 and 28 are moulded in the knuckle body 12, wherein cast material flows between the pipes 26 and 28. After solidifying, the cast steering knuckle 10 can be withdrawn and the cores for the through holes 20, 22 and blind holes 24 be removed.

Figure 4:
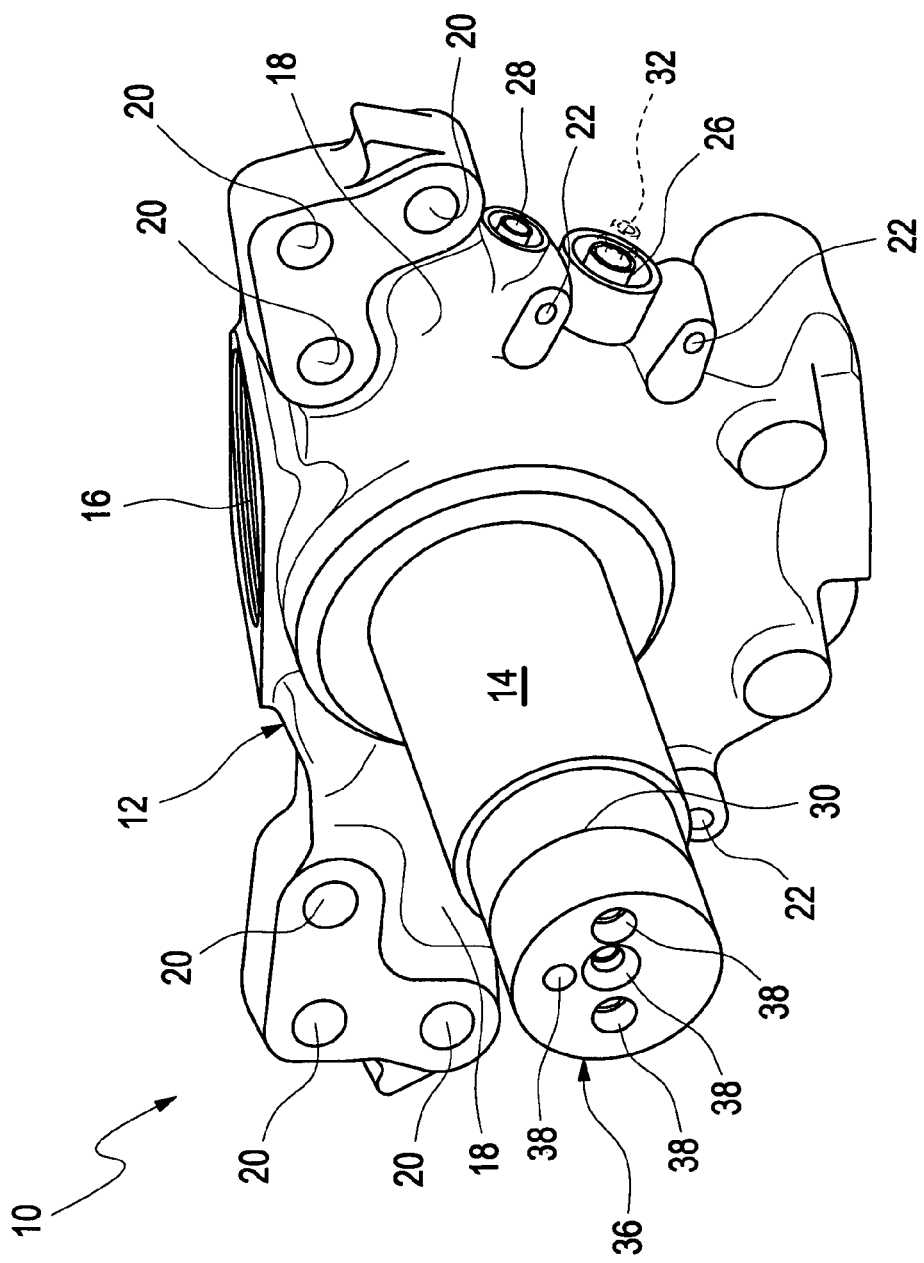
FIG. 4 an isometric drawing of a second embodiment of a cast steering knuckle according to the invention, wherein the pipes are equipped with a front mounting.
Figure 5:
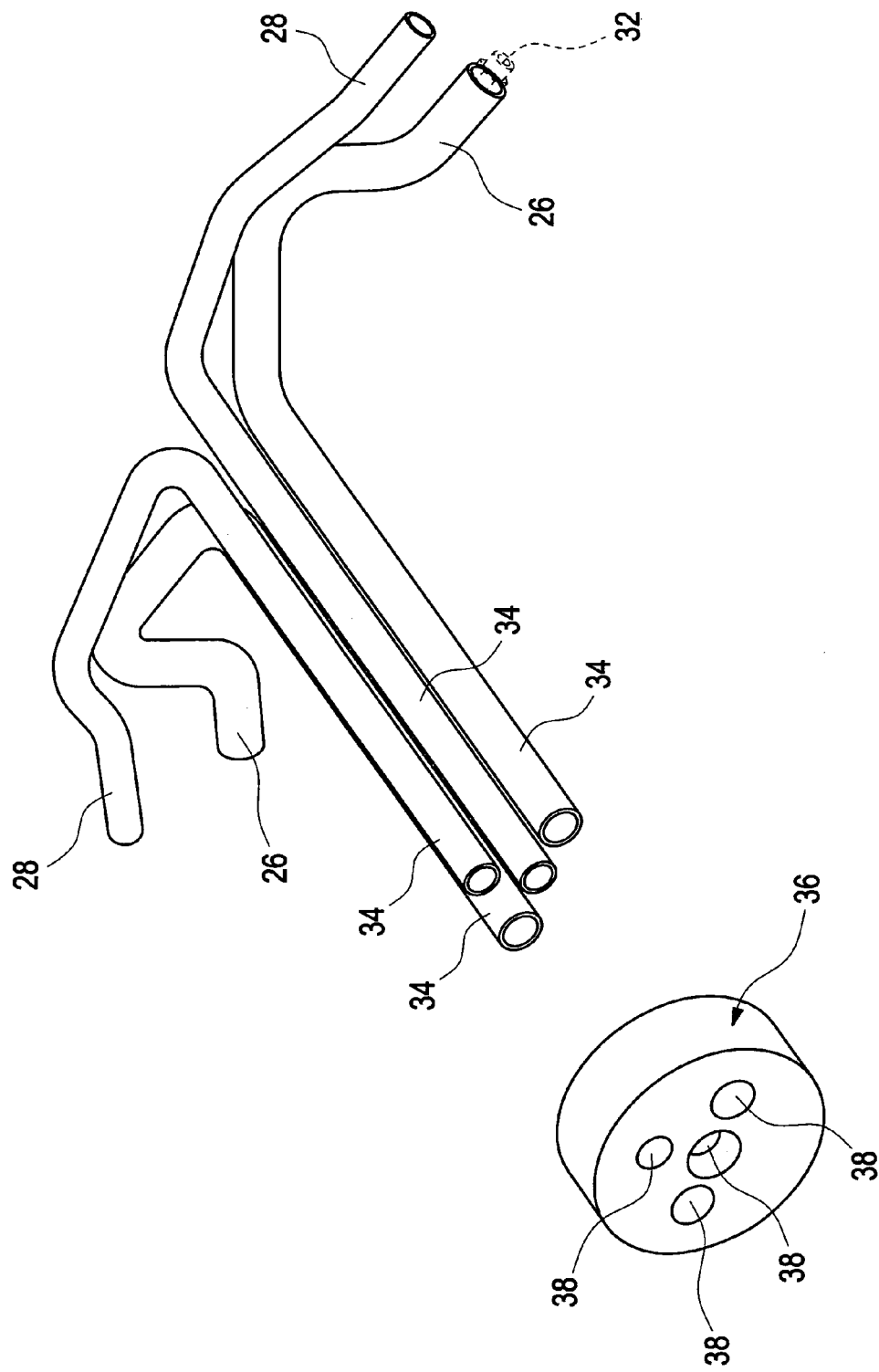
FIG. 5 an explosion diagram of the pipes and the front mounting of FIG. 4.
Figure 6:
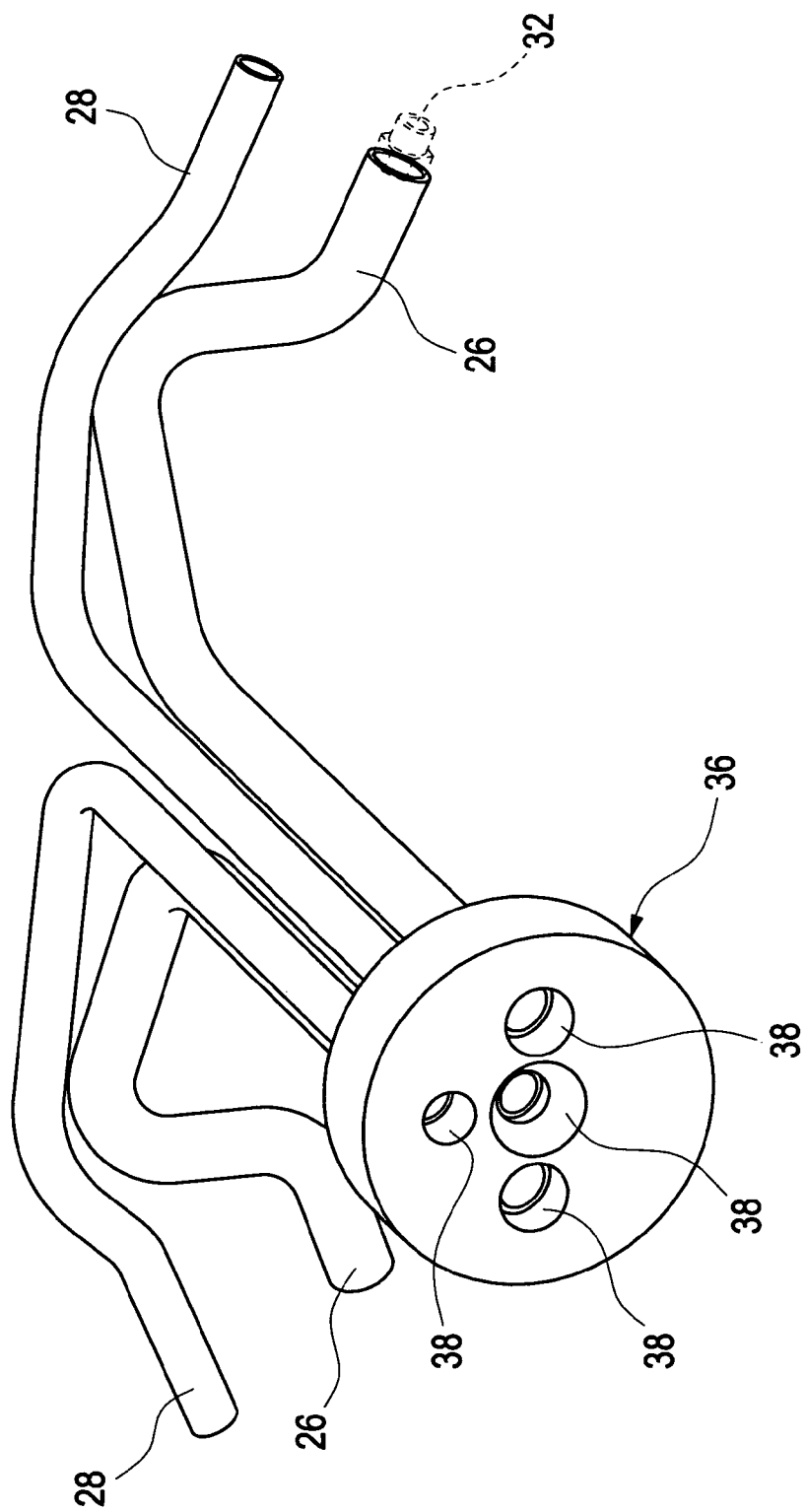
FIG. 6 an isometric drawing of the pipes of FIGS. 4 and 5 equipped with the front mounting.

FIGS. 4 to 6 show a second embodiment, in which the pipes 26 and 28 are equipped with a front mounting 36 which engages free ends of each pipe 26 and 28. The front mounting 36 is located at the end face 30 of the stub axle 14. The front mounting 36 is a plate with a through hole 38 for each free end, in which the free ends of the pipes 26 and 28 can be fixed before casting the knuckle body 12. This is depicted in FIG. 6. FIG. 5 illustrates the situation before fixing the free ends of the pipes 26 and 28 in the through holes 38 of the front mounting 36. Advantageously, the front mounting 36 can provide areas which allow a torsionally stiff connection to an axle, e.g. splines (not shown) at the outer circumference. Thus, even high torques can be handled when a hydraulic motor is attached to the steering knuckle 10.

By means of the front mounting 36 the pipes 26 and 28 are also held in their position during the casting process. The front mounting 36 can be fixed in a wall of the casting mould, such that the free ends of the pipes 26 and 28 are sealed against cast material.

The invention is not limited to cast steering knuckles 10 for trucks with hydraulic wheel motors. The invention can be used also for other kinds of vehicles, particularly commercial vehicles.

Further it can be used for other kinds of devices different from a hydraulic wheel motor. For example the invention can be applied to installations with central tire inflation systems (CTIS).

Instead for hydraulic oil, the inventive pipes 26 and 28 can also be adapted for other kinds of hydraulic fluid or other liquid or gaseous fluids different from hydraulic fluid. For example when used with CTIS compressed air can be used as fluid.

It is also possible that more or less than four pipes 26 and 28 are contained in the knuckle body 12. Moreover, the cross sections of the pipes 26 and 28 are not necessarily circular but can have an oval shape, a triangular shape, a square shape or any cross section which is desired. It is even possible for optimizing the usage of space in the knuckle body 12 and/or for adapting the flow resistance or the flow properties of the pipes 26, 28 to provide one or more pipes 26, 28 with varying diameters and/or cross sections along their extensions.

The pipes 26 and 28 can also be equipped with the fittings 32 after casting the knuckle body 12.

One or more of the pipes 26 and 28 also can be bent only in two dimensions.

Instead of having hydroformed bodies, one or more of the pipes 26 and 28 can have only one or more hydroformed portions along its pipe body. The pipes 26 and 28 also can be formed by using a method different from hydroforming.

Instead of having a length of at least eight times the diameter, one or more of the pipes 26 and 28 can have a length of at least five times the diameter or less.

Instead of being concentrated in a middle portion of the knuckle body 12, one or more of the pipes 26 and 28 can be located in an off-centre position of the knuckle body 12, in particular of the stub axle 14. It is also possible that two or more of the pipes 26 and 28 bear against each other and no cast material is arranged between them.

In the second embodiment shown in FIGS. 4 to 6, additionally or alternatively of being integrated in the front mounting 36 before casting the knuckle body 12, one or more pipes 26 and 28 can be connected together directly. This is also possible with the first embodiment shown in FIGS. 1 to 3.

The outer surfaces 34 of the pipes 26 and 28 can also be free of a surface coating. It is also possible to use a surface coating without zinc, comprising tin for example.

In the second embodiment, shown in FIGS. 4 to 6, one or more further front mountings 36 can be provided for integrating the other free ends of the pipes 26 and 28.

The invention claimed is:

1. A cast steering knuckle for a vehicle, comprising a knuckle body, wherein at least two pipes, each comprising a pipe body, are molded into the knuckle body providing a duct for a fluid and/or one or more electrical harnesses.

2. The cast steering knuckle according to claim 1, wherein the at least two pipes are equipped with at least one fitting before casting the knuckle body.

3. The cast steering knuckle according to claim 1, wherein the at least two pipes are equipped with at least a front mounting which integrates at least one free end of the at least two pipes.

4. The cast steering knuckle according to claim 1, wherein at least one of the at least two pipes is bent at least by 90°.

5. The cast steering knuckle according to claim 1, wherein a bending radius of the at least two pipes is larger than the inner diameter of the respective pipe.

6. The cast steering knuckle according to claim 1, wherein at least one of the one or more pipes is bent at least in two dimensions.

7. The cast steering knuckle according to claim 1, wherein a pipe body of at least one of the at least two pipes has one or more hydroformed portions along its pipe body.

8. The cast steering knuckle according to claim 6, wherein at least one of the at least two pipes has a hydroformed body.

9. The cast steering knuckle according to claim 1, wherein at least one of the at least two pipes has a length of at least five times the diameter.

10. The cast steering knuckle according to claim 1, wherein the at least two are concentrated in a middle portion of the knuckle body.

11. The cast steering knuckle according to claim 1, wherein the at least two pipes are fixed together before casting the knuckle body.

12. The cast steering knuckle according to claim 1, wherein between the at least two pipes cast material of the knuckle body is arranged.

13. The cast steering knuckle according to claim 1, wherein at least one of the at least two pipes is provided with a surface coating at the outer surface.

14. The cast steering knuckle according to claim 12, wherein the surface coating at the outer surface comprises zinc or tin.

15. The cast steering knuckle according to claim 1, wherein at east one of the at least two pipes are provided as a duct for a hydraulic fluid.

16. The cast steering knuckle according to claim 1, wherein at least three pipes are contained in the knuckle body.

17. The cast steering knuckle according to claim 15, comprising at least three pipes casted in an axle part of the steering knuckle.

18. The cast steering knuckle according to claim 1, wherein at least four pipes are contained in the knuckle body.

19. A vehicle, a wheel coupled to a cast steering knuckle according to claim 1 provided with a hydraulic motor.

* * * * *